United States Patent [19]
Emery et al.

[11] Patent Number: 5,114,179
[45] Date of Patent: May 19, 1992

[54] SAFETY APPARATUS

[75] Inventors: Jerome W. Emery, Lakeland, Fla.; John P. O'Loughlin, Mesa, Ariz.

[73] Assignee: TRW Inc., Lyndhurst, Ohio

[21] Appl. No.: 629,426

[22] Filed: Dec. 18, 1990

[51] Int. Cl.⁵ .................. B60R 21/28; C06D 5/00
[52] U.S. Cl. ........................ 280/741; 102/530; 206/522
[58] Field of Search .............. 280/743, 741, 737; 102/530, 531; 206/522, 583

[56] References Cited

U.S. PATENT DOCUMENTS

| | | |
|---|---|---|
| 3,986,456 | 10/1976 | Doin et al. ............ 280/741 |
| 4,093,068 | 6/1978 | Smrt ..................... 206/522 |
| 4,136,894 | 1/1979 | Ono et al. . |
| 4,296,084 | 10/1981 | Adams et al. . |
| 4,561,675 | 12/1985 | Adams et al. ......... 280/741 |
| 4,734,265 | 3/1988 | Nilsson et al. . |

Primary Examiner—Charles A. Marmor
Assistant Examiner—Paul Dickson
Attorney, Agent, or Firm—Tarolli, Sundheim & Covell

[57] ABSTRACT

An apparatus for use in inflating a vehicle occupant restraint includes an inflator housing and a canister containing gas generating material. The canister has a resiliently deflectable wall which presses against the inflator housing to hold the canister against movement relative to the inflator housing. A cushion is disposed inside the canister between the wall and the gas generating material. In addition, auto ignition material is disposed in a projecting wall portion of the canister. When the apparatus is assembled, the wall of the canister is resiliently deflected by applying a force against the projecting wall portion of the canister. After the inflator housing has been closed, the canister is retained against movement relative to the inflator housing by the force applied by the resiliently deflected wall of the canister against the inflator housing.

19 Claims, 4 Drawing Sheets

SAFETY APPARATUS

BACKGROUND OF THE INVENTION

The present invention relates to a new and improved safety apparatus for use in inflating a vehicle occupant restraint, such as an air bag.

A known safety apparatus for use in inflating an air bag is disclosed in U.S. Pat. No. 4,902,036. This safety apparatus includes an inflator having a housing formed by a base and a diffuser. A canister containing gas generating material is disposed within the inflator housing.

Although the safety apparatus disclosed in the aforementioned patent is generally satisfactory in its construction and mode of operation, manufacturing tolerances may result in the canister of gas generating material being loosely held in the inflator housing. When this occurs, the canister may make an objectionable rattling noise.

SUMMARY OF THE INVENTION

An improved apparatus for use in inflating a vehicle occupant restraint includes an inflator housing. A canister containing gas generating material is disposed in the inflator housing. The canister has a wall which is resiliently deflected during assembly of the apparatus. This wall presses against the inflator housing to hold the canister against movement relative to the inflator housing.

The resiliently deflected wall of the canister may include a projecting portion which at least partially defines a recess containing an auto ignition material. The projecting portion of the wall of the canister is disposed in engagement with the inflator housing.

BRIEF DESCRIPTION OF THE DRAWINGS

The foregoing and other features of the present invention will become apparent to one skilled in the art upon a consideration of the following description taken in connection with the accompanying drawings wherein.

DESCRIPTION OF ONE SPECIFIC PREFERRED EMBODIMENT OF THE INVENTION

Figure 1:
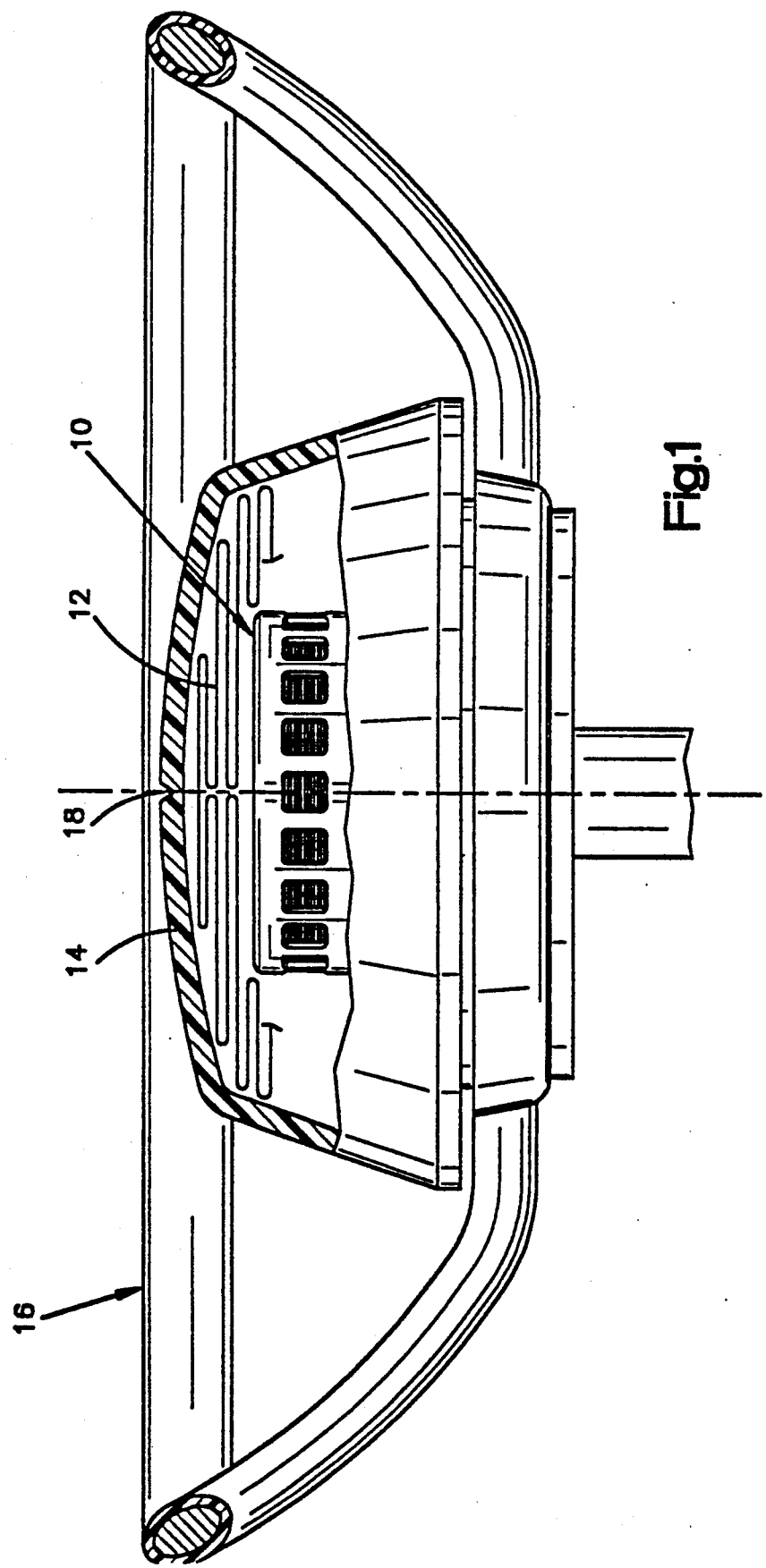
FIG. 1 is a partially broken away schematic illustration of a safety apparatus constructed in accordance with the present invention and mounted on the steering wheel of the vehicle.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. A air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat imperforate upper end wall 64 and a flat lower flange 66. The upper end wall 64 and the lower flange 66 are generally parallel to each other and perpendicular to the axis 52. An annular array of openings 68 extends circumferentially around a lower portion of the combustion side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but slightly offset annular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely a lower canister section 92 and a cover 94. The radially outer edge of the canister cover 94 is crimped to an adjacent edge of the canister lower section 92 at a single annular hermetic double seam 95. The canister 90 is preferably made of relatively thin aluminum.

The canister lower section 92 has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109. The auto ignition material is preferably a stabilized nitrocellulose composition, such as IMR 4895 which is commercially available from E. I. DuPont de Nemours & Co. The auto ignition material ignites at a temperature of about 350° F.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. The gas generating material ignites at a temperature of about 650° F. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser cup upper end wall 54. Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The initiator assembly 140 includes the igniter 142. The igniter 142 includes a pair of wire leads 146 which extend outwardly from the initiator assembly 140. The wire leads 146 are connectable to a collision sensor (not shown). The wire leads 146 are connected to a resistance wire embedded in an ignition material in the igniter 142. The igniter 142 may be of any suitable well known construction. A thin plastic film (not shown) is located on the outside of the upper portion of the igniter 142, to prevent metal-to-metal contact which could ground the igniter 142 and disable the inflator 10.

Upon the occurrence of a collision or other sudden vehicle deceleration, the collision sensor closes an electrical circuit. An electrical current then flows through the wire leads 146 to the igniter 142. The resistance wire sets off the ignition material which ignites a charge in the igniter 142. Ignition of the charge forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the flowing gas. When the gas cools, molten products are plated onto the prefilter 120. The gas flows through the openings 68 and into the slag screen 122.

The slag screen 122 removes and traps particles from the flowing gas. The slag screen also cools the flowing gas. When the gas cools, molten combustion products such as metal are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

Figure 3:
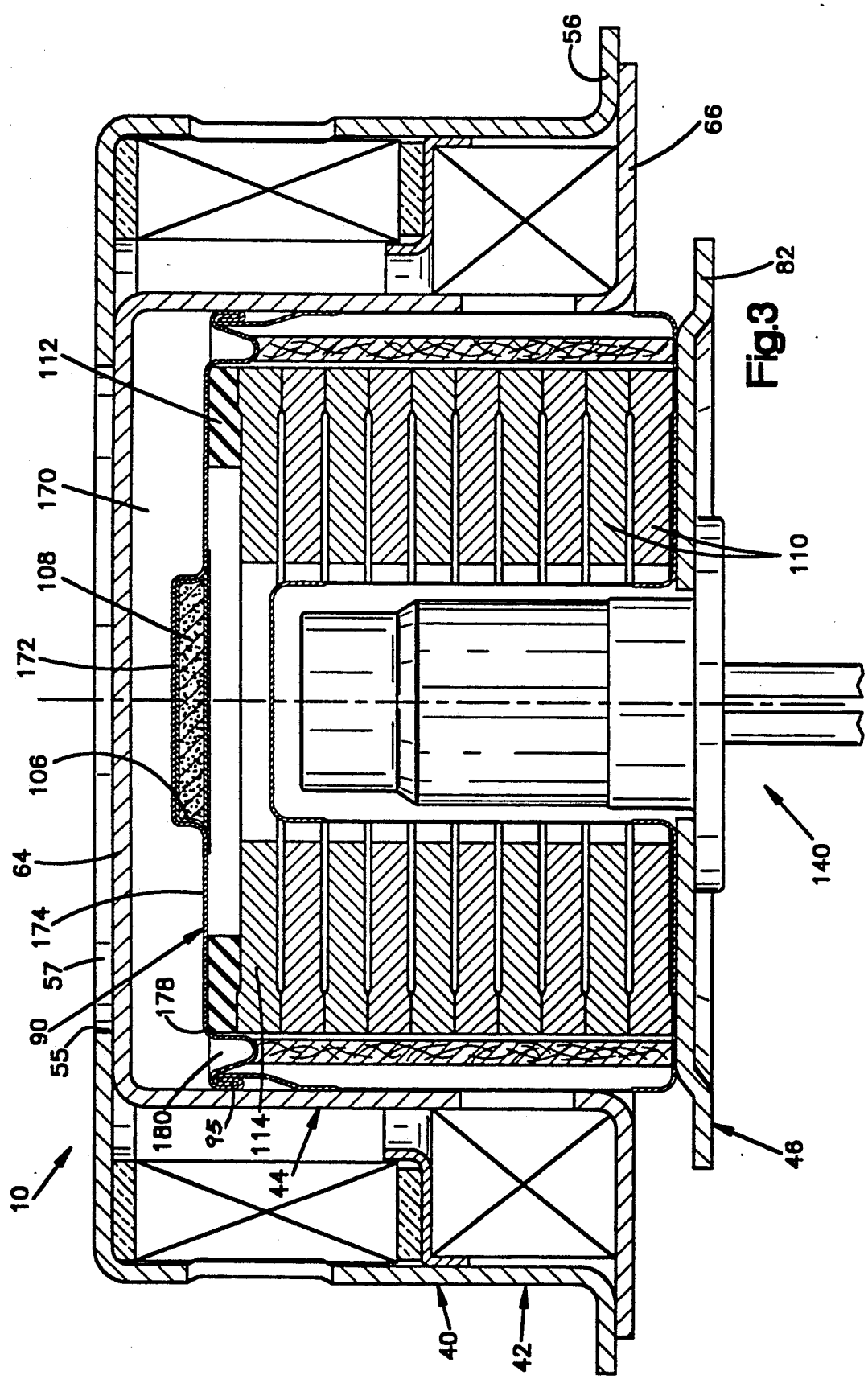
FIG. 3 is a sectional view depicting the positioning of a canister containing gas generating material and an inflator housing relative to each other during assembly of the inflator of FIG. 2.

During assembly of the inflator 10, the parts are positioned relative to each other as shown in FIG. 3. The canister 90 and cover 46 are abutting. The canister 90 is telescopically received in a cylindrical chamber 170 in the combustion cup 44 (FIG. 3). The canister 90 extends around and is coaxial with the initiator assembly 140.

Figure 4:
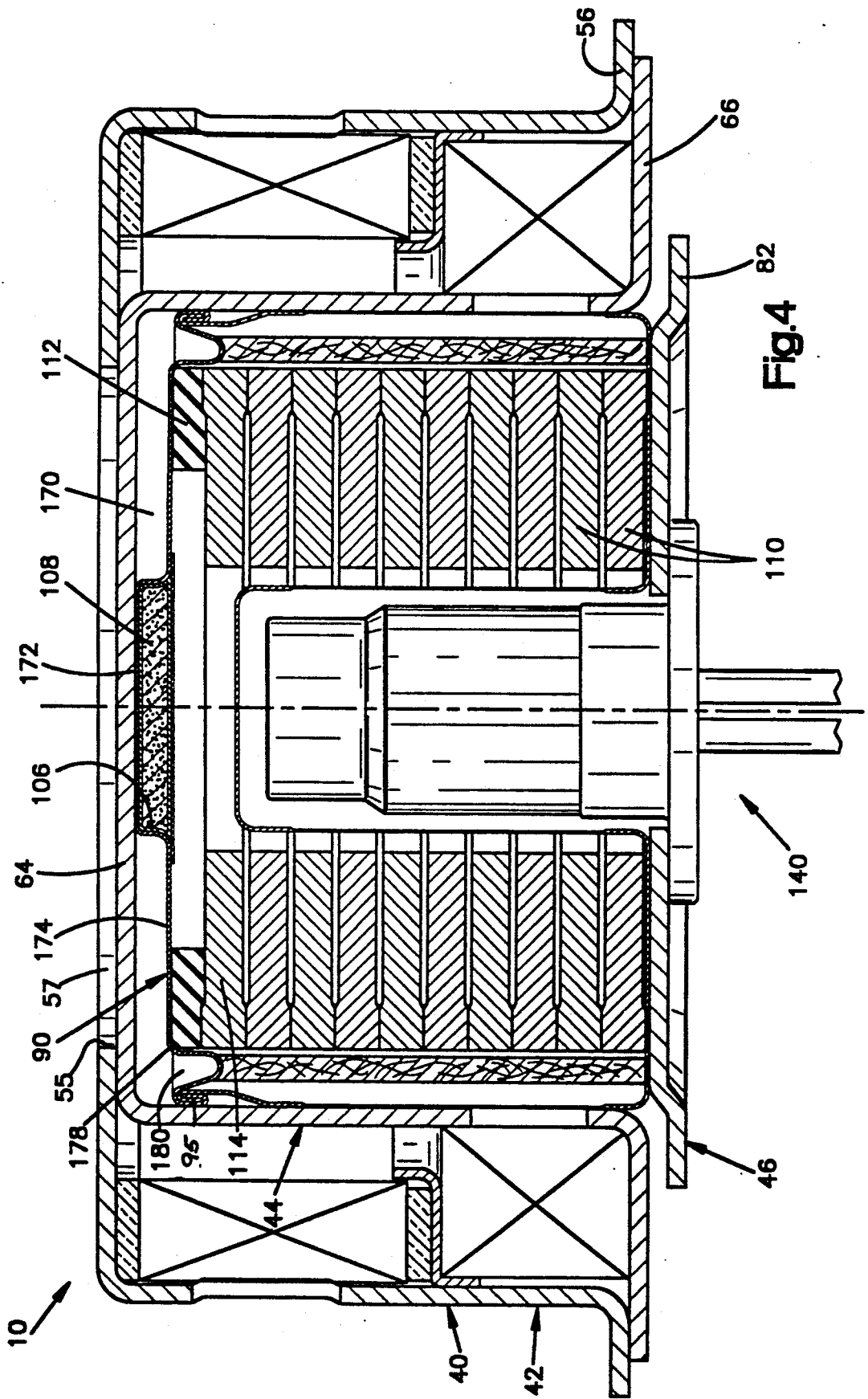
FIG. 4 is a sectional view, generally similar to FIG. 3, illustrating the manner in which a projecting portion on a wall of the canister engages the inflator housing immediately before the wall of the canister is resiliently deflected as the inflator housing is closed.

The canister 90 and cover 46 are moved axially relative to the inflator housing 40, from the position shown in FIG. 3 to the position shown in FIG. 4. During this movement, a generally cylindrical projection 172 on a circular canister end wall 174 is moved into abutting engagement with the circular end wall 64 of the combustion cup 44 (FIG. 4). The projection 172 defines the recess 106 in the canister cover 94 and has a flat circular upper (as viewed in FIG. 4) end surface. The upper end surface of the projection 172 abuttingly engages a flat circular inner side surface of the combustion cup end wall 64. The portion of the canister end wall 174 which is disposed radially outwardly from the projection 172 is spaced from the combustion cup end wall 64.

Figure 2:
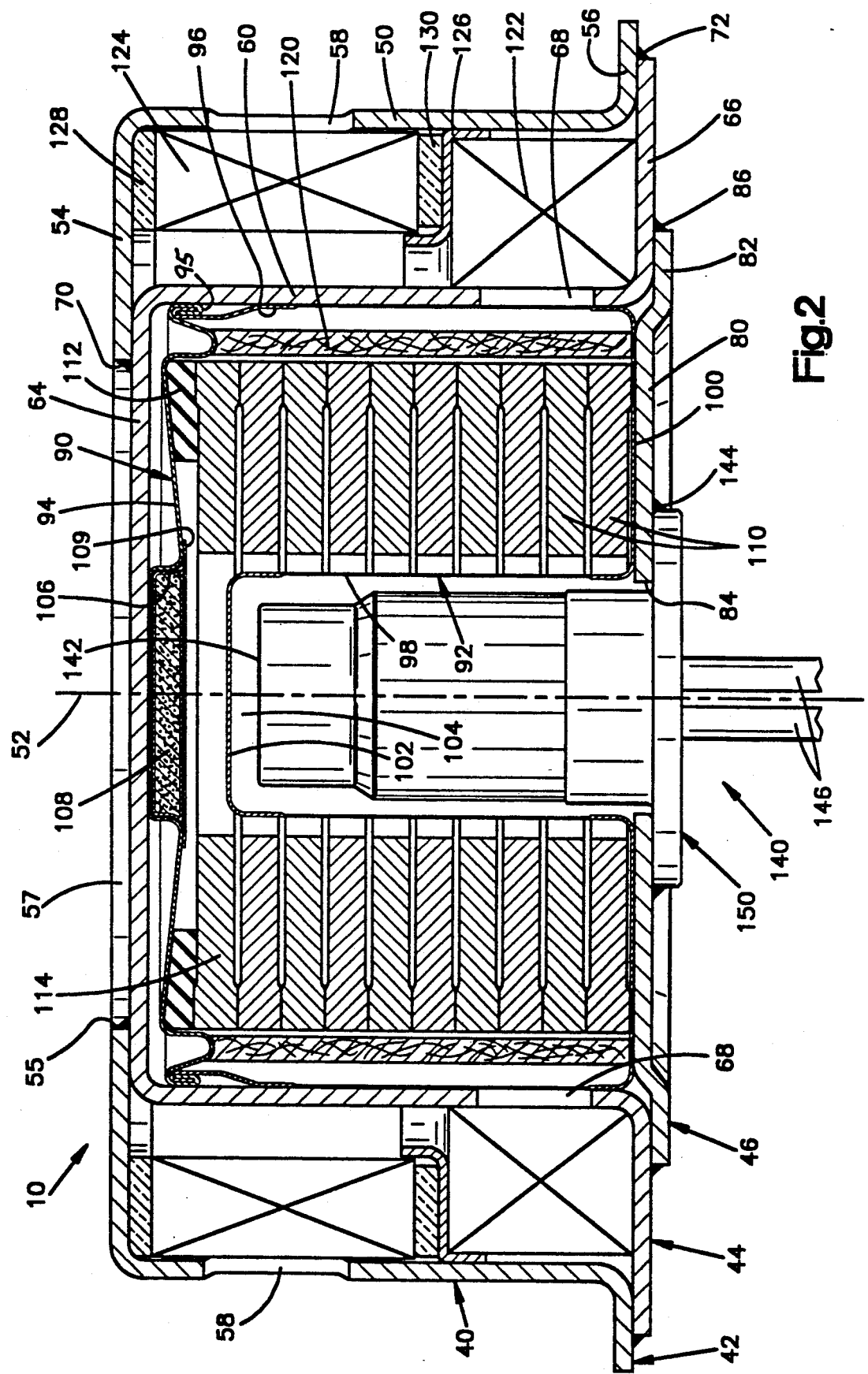
FIG. 2 is a sectional view of an inflator which forms a part of the safety apparatus of FIG. 1.

Continued relative axial movement of the canister 90 and cover 46 relative to the inflator housing 40 from the position shown in FIG. 4 to the position shown in FIG. 2 moves the annular cover flange 82 into abutting engagement with the annular combustion cup flange 66. As the cover 46 moves into engagement with the combustion cup 44, the canister end wall 174 is resiliently deflected axially inwardly toward the igniter 142 from the position shown in FIG. 4 to the position shown in FIG. 2. At the canister end wall 174 is deflected axially inwardly, the annular cushion 112 is compressed between the inner side surface of the canister end wall 174 and the uppermost disk 114 of gas generating material.

The resilient deflection of the canister end wall occurs in an annular area disposed adjacent to and immediately radially outwardly of the projection 172. In addition, the resilient deflection of the canister end wall 174 occurs in an annular portion 178 adjacent to and radially inward of an annular recess 180 in the radially outermost portion of the canister end wall 174. The recess 180 is U-shaped in section and is located between the portion 178 and the annular double seam 95 which hermetically seals the canister 90. When the canister end wall 174 reaches the position shown in FIG. 2, the combustion chamber cover 46 is secured in the closed position of FIG. 2 by the weld 86.

The resiliently deflected canister end wall 174 (FIG. 2 presses against the combustion cup end wall 64 to hold the canister 90 against movement relative to the closed inflator housing 40. In addition, since the projection 172 on the canister end wall 174 is pressed firmly against the combustion cup end wall 64, heat can be readily conducted from outside the inflator housing 40 to the auto ignition material 108 in the recess 106 defined by the projection.

A buildup of tolerances in the manufacture and assembly of the canister 90, combustion cup 44 and cover 46 can be accommodated by varying the amount to which the canister end wall 174 is deflected. Thus, if the build up of tolerances between the various components of the inflator 10 is such as to provide a relatively large space between the end wall 174 of the canister and the combustion chamber end wall 64, the extent of deflection of the canister end wall 174 is reduced. Similarly, if the build up of tolerances between the various components of the inflator 10 is such as to provide a relatively small space between the upper end of the canister 90 on the combustion chamber end wall 64, the canister end wall 174 is deflected to a greater extent. Regardless of the extent of deflection of the canister end wall 174, the canister end wall presses against the combustion chamber end wall 64 to hold the canister 90 against movement relative to the inflator housing 40.

The force with which the canister end wall 174 presses against the combustion cup end wall 64 is equal to the sum of the forces resulting from resilient deflection of the canister end wall 174 and resilient compression of the cushion 112. The cushion 112 applies force against the uppermost gas generating disk 114 and against the inner side surface of the canister end wall 174 urging the canister end wall back toward its initial or undeflected condition (FIGS. 3 and 4). In addition, the natural resilience of the material forming the canister end wall 174 urges the canister end wall back toward its undeflected condition. The annular cushion 112 is formed of a resiliently compressible, low density, closed cell, silicone foam material which continuously urges the canister end wall 174 back toward its initial position. The foam material is sold by Bisco Products Incorporated of Elk Grove Village, Ill. under the tradename "Foamega".

The resilient force transmitted between the canister end wall 174 and the combustion cup end wall 64 also presses the canister 90 firmly against the cover 46. Therefore, the canister 90 is held against movement relative to the inflator housing 40. The presence of the partially compressed cushion 112 ensures that the canister end wall 174 continuously presses against the combustion cup end wall 44 with sufficient force to hold the canister 90 against movement relative to the inflator housing 40 over a long period of time. In addition, the cushion 112 holds the disks 110 of gas generating material against movement relative to the canister 90.

There is no possibility of the hermetic seam 95 being damaged by engagement with the combustion chamber end wall 64. This is because the cylindrical projection 172 on the canister end wall 174 engages the combustion chamber end wall 64 while the hermetic seam 95 is spaced a substantial distance from the combustion chamber end wall. Even when the canister end wall 174 is deflected, as shown in FIG. 2, the hermetic seam 95 is spaced from the combustion chamber end wall 64. In the absence of the cylindrical projection 172, there is a possibility that the hermetic seam 95 could be damaged by being compressed against the combustion chamber end wall due to an accumulation of tolerances.

The combustion cup 44 and diffuser cup 42 have been shown and described as being in an upright orientation during assembly of the inflator 10. However, it may be preferable to have the combustion cup 44 and diffuser cup 42 inverted from the illustrated orientation during assembly of the inflator 10. If this were done, canister 90 would be moved downwardly into the chamber 170 rather than upwardly, as shown in FIGS. 3 and 4.

From the above description of the invention, those skilled in the art will perceive improvements, changes and modifications. Such improvements, changes and modifications within the skill of the art are intended to be covered by the appended claims.

Having described the invention, the following is claimed:

1. A method of assembling an apparatus for inflating a vehicle occupant restraint, said method comprising the steps of:
   positioning a canister containing gas generating material and an inflator housing relative to each other;
   resiliently deflecting a wall of the canister by applying a force against the wall of the canister by pressing the wall against a first wall of the inflator housing; and retaining the canister against movement relative to the inflator housing by transmitting force between the resiliently deflected wall of the canister and a second wall of the inflator housing.

2. A method as set forth in claim 1 wherein the step of resiliently deflecting the wall of the canister includes resiliently deflecting the wall inwardly as the canister and inflator housing are positioned relative to each other.

3. A method as set forth in claim 1 further including the step of at least partially compressing a cushion between an inner side surface of the canister and the gas generating material during said step of resiliently deflecting a wall of the canister.

4. A method as set forth in claim 1 wherein the step of retaining the canister against movement by transmitting force includes applying a resilient restoring force resulting from said deflected wall against the inflator housing.

5. A method as set forth in claim 1 wherein the wall of the canister includes a projecting portion which at least partially defines a recess containing auto ignition material, said step of resiliently deflecting the wall of the canister including engaging the inflator housing with the projecting portion of the wall and resiliently deflecting the wall of the canister adjacent to the projecting portion while maintaining the projecting portion of the wall of the canister in engagement with the inflator housing.

6. A method as set forth in claim 1 wherein said step of resiliently deflecting the wall of the canister is performed while maintaining the wall of the canister spaced from the gas generating material.

7. A method as set forth in claim 1 wherein said step of positioning a canister containing gas generating material and an inflator housing relative to each other includes moving a first wall of the canister into engagement with a wall of the inflator housing while maintaining a seam between the first wall of the canister and a second wall of the canister spaced from the inflator housing wall, said step of resiliently deflecting a wall of the canister includes pressing the first wall of the canister against the inflator housing wall while maintaining the seam spaced from the inflator housing wall.

8. An apparatus for use in inflating a restraint for an occupant of a vehicle, said apparatus comprising:
an inflator housing, said inflator housing including first and second end walls which partially define a chamber; and
a canister containing gas generating material, said canister including a first wall, a second wall and a side wall, said side wall of said canister being fixedly attached to said first and second walls of said canister, said first wall of said canister engaging said first wall of said housing, said first wall of said canister being resiliently deformed and pressing against said first wall of said housing, said second wall of said canister engaging said second wall of said housing, said side wall transmitting force from said resiliently deformed first wall of said canister to maintain said second wall of said canister in engagement with said second wall of said housing.

9. An apparatus as set forth in claim 8, further including a cushion disposed in said canister between said first wall of said canister and the gas generating material, said cushion being at least partially compressed by said first wall of said canister.

10. An apparatus as set forth in claim 8, wherein said first wall of said canister includes a projecting portion which at least partially defines a recess containing auto ignition material, said projecting portion of said first wall of said canister being disposed in engagement with said first wall of said inflator housing, said first wall of said canister being resiliently deflected adjacent to said projecting portion of said first wall of said canister.

11. An apparatus as set forth in claim 8, wherein said first wall of said canister is spaced from the gas generating material in said canister.

12. An apparatus as set forth in claim 8, wherein a central portion of said first wall of said canister is disposed in abutting engagement with said first wall of said inflator housing and a portion of said first wall of said canister outwardly from said central portion is spaced from said first wall of said inflator housing.

13. An apparatus as set forth in claim 8, said canister including a seam, said seam interconnecting said first and side walls of said canister, said second and side walls of said canister being elements of a continuous unitary member.

14. An apparatus as set forth in claim 8, wherein a portion of said side wall of said canister is of reduced thickness to permit said side wall to rupture upon ignition of the gas generating material.

15. An apparatus for use in inflating a restraint for a occupant of a vehicle, said apparatus comprising:
an inflator housing having a chamber;
a canister containing gas generating material located in said chamber, said canister having a resiliently deflected wall pressing against said inflator housing to hold said canister against movement in said chamber relative to said housing; and
a cushion disposed in said canister between said wall of said canister and the gas generating material, said cushion being at least partially compressed by said wall of said canister to provide a force for resisting deflection of said wall of said canister and to hold the gas generating material against movement.

16. An apparatus as set forth in claim 15, wherein said wall of said canister includes a projecting portion which at least partially defines a recess containing auto ignition material, said projecting portion of said wall of said canister being disposed in engagement with said inflator housing, said wall of said canister being resiliently deflected adjacent to said projecting portion of said wall of said canister.

17. An apparatus as set forth in claim 15, wherein said wall of said canister is spaced from the gas generating material in said canister.

18. An apparatus as set forth in claim 15, wherein a central portion of said wall of said canister is disposed in abutting engagement with said inflator housing and a portion of said wall of said canister outwardly from said central portion is spaced from said inflator housing.

19. An apparatus as set forth in claim 15, said canister including a lower section and a seam interconnecting said wall and said lower section of said canister, said wall and said lower section of said canister enclosing the gas generating material, said seam providing a hermetic seal between said wall and said lower section of said canister, said wall providing a force to maintain said lower section of said canister in engagement with said housing.

* * * * *